US012586807B2

(12) United States Patent
Kikuchi

(10) Patent No.: US 12,586,807 B2
(45) Date of Patent: Mar. 24, 2026

(54) FUEL CELL

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventor: Isamu Kikuchi, Kawasaki Kanagawa (JP)

(73) Assignees: KABUSHIKI KAISHA TOSHIBA, Kawasaki (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 812 days.

(21) Appl. No.: 17/940,896

(22) Filed: Sep. 8, 2022

(65) Prior Publication Data

US 2023/0006238 A1 Jan. 5, 2023

Related U.S. Application Data

(63) Continuation of application No. PCT/JP2021/020230, filed on May 27, 2021.

(30) Foreign Application Priority Data

Jun. 23, 2020 (JP) ................................ 2020-107392

(51) Int. Cl.
*H01M 8/2485* (2016.01)
*H01M 8/248* (2016.01)
(52) U.S. Cl.
CPC ......... *H01M 8/2485* (2013.01); *H01M 8/248* (2013.01)

(58) Field of Classification Search
CPC ............................ H01M 8/248; H01M 8/2485
See application file for complete search history.

(56) References Cited

U.S. PATENT DOCUMENTS

2006/0093890 A1* 5/2006 Steinbroner .......... H01M 8/248
429/511
2018/0331384 A1* 11/2018 Feldman ............. H01M 10/658
2021/0143448 A1* 5/2021 Blackburn ............ H01M 8/222

FOREIGN PATENT DOCUMENTS

JP       H1-209669 A      8/1989
JP       H01209669      *  8/1989
JP       2011-8951 A      1/2011
(Continued)

OTHER PUBLICATIONS

State Intellectual Property Office of People's Republic of China, Office Action in CN App. No. 202180020860, 7 pages, and machine translation, 5 pages (Apr. 28, 2025).

*Primary Examiner* — Brittany L Raymond
(74) *Attorney, Agent, or Firm* — Finnegan, Henderson, Farabow, Garrett & Dunner, LLP

(57) ABSTRACT
A fuel cell including: a fuel cell stack; a pair of end plates holding the fuel cell stack by tightening from both ends; and a plurality of gas manifolds fixed to the fuel cell stack and end plates with the sealing members therebetween to supply fuel and oxidant to each of fuel gas flow paths and oxidant gas flow paths of the fuel cell stack, the fuel cell includes: a gas manifold fixing band including: hold plates installed in contact with a back of the gas manifold; a hold plate connecting part connecting the hold plates installed on the backs of adjacent gas manifolds; and a band-tightening part connecting and tightening both ends of a series of hold plates and the hold plate connecting part.

5 Claims, 9 Drawing Sheets

(56)          References Cited

FOREIGN PATENT DOCUMENTS

| | | | |
|---|---|---|---|
| JP | 5086581 | B2 | 11/2012 |
| JP | 2013-20740 | A | 1/2013 |
| JP | 2019-503030 | A | 1/2019 |
| JP | 2020-87659 | A | 6/2020 |

* cited by examiner

B-B SECTIONAL
VIEW

FUEL CELL

CROSS REFERENCE TO RELATED APPLICATIONS

The present application is a continuation application of International Application No. PCT/JP2021/020230, filed May 27, 2021. The contents of this application are incorporated herein by reference in their entirety.

FIELD

Embodiments described herein relate generally to a fuel cell.

BACKGROUND

A fuel cell is a power generator that directly converts chemical energy of fuel into electrical energy by supplying a fuel such as hydrogen and an oxidant such as air to a fuel cell stack, which is constituted by stacking a plurality of unit cells, causing the fuel and oxidant to react electrochemically, and extracts the electrical energy to the outside. The unit cell of the fuel cell stack includes an anode electrode and a cathode electrode, which are arranged on each side of an electrolyte, and a separator between these electrodes.

The separator has a fuel gas flow path and an oxidant gas flow path that are respectively in contact with the anode electrode and the cathode electrode. A pair of end plates are installed at both ends of the fuel cell stack, and the end plates hold the fuel cell stack by tightening the fuel cell stack from a stacking direction of the unit cells.

In addition, the fuel cell is provided with a gas manifold to supply fuel and oxidant to the fuel gas flow path and oxidant gas flow path of the separator. A method in which the gas manifold is attached outside the fuel cell stack is called an external manifold method. In an external manifold fuel cell, the gas manifold is fixed to the end plate.

When the gas manifold is fixed to the end plate, an elastic sealing member is sandwiched between the fuel cell stack and the gas manifold and between the end plate and the gas manifold. In the fuel cell, such a sealing member prevents gas inside the fuel cell stack and gas manifold from leaking to the outside of the fuel cell stack and gas manifold.

In a fuel cell, a gas manifold may deform in a direction away from a fuel cell stack, such as by swelling around a center of the gas manifold due to flow of gas or cooling water through the fuel cell during fuel cell operation. In this case, the deformation of the gas manifold may cause a sealing member to peel off from any of the fuel cell stack, end plate, and gas manifold, which may reduce gas sealing performance of the sealing member.

In recent years, the fuel cell has been increasing in capacity, and the fuel cell tends to become larger according thereto. As a result, an amount of deformation of the gas manifold also increases, and the sealing member tends to peel off from the gas manifold and other parts. As a result, the gas sealing performance of the sealing member becomes difficult to ensure.

To prevent deterioration of the gas sealing performance of the sealing member, the deformation of the gas manifold should be prevented, and it is important that the gas manifold has sufficient mechanical strength. Therefore, measures such as the following may be considered.

(1) The gas manifold should be made of a material that is resistant to elastic deformation.

(2) The gas manifold should be a thick-plate structure.

(3) The gas manifold should have a structure where ribs are installed on a back thereof.

However, when trying to provide sufficient mechanical strength to the gas manifold, the gas manifold itself becomes expensive in (1) and (2) above, and the manufacturing cost increases in (3) above, leading to higher costs. Therefore, in a conventional fuel cell, it has been desired to prevent the deterioration of the gas sealing performance of the sealing member and at the same time, reduce the cost. Especially in recent years, as the fuel cell has become larger in capacity, costs have also tended to increase, making it imperative to reduce costs.

An object of the present invention is to provide a fuel cell in which the gas sealing performance of the sealing member can be ensured without depending on the mechanical strength of the gas manifold, preventing deterioration of the gas sealing performance and reducing cost.

BRIEF DESCRIPTION OF THE DRAWINGS

FIG. 8 is a perspective view of a third embodiment.

FIG. 9A is a side view of the third embodiment.

FIG. 9B is an E-E sectional view of the third embodiment.

FIG. 13 is a partial sectional view of a fuel cell stack.

DETAILED DESCRIPTION

A fuel cell of the embodiment, which includes: a fuel cell stack that is constituted by stacking a plurality of unit cells formed by an anode electrode and a cathode electrode arranged on each side of an electrolyte, and a separator arranged in contact with each of the anode electrode and the cathode electrode and having a fuel gas flow path and an oxidant gas flow path; a pair of end plates that hold the fuel cell stack by tightening from both ends; and a plurality of gas manifolds that are fixed to the fuel cell stack and the end plates with sealing members therebetween to supply fuel and oxidant, respectively, to each of the fuel gas flow paths and the oxidant gas flow paths of the fuel cell stack, the fuel cell includes a gas manifold fixing band configured to include: hold plates that are each installed in contact with a back of the gas manifold; a hold plate connecting part that connects the hold plates installed on the backs of adjacent gas manifolds with each other; and a band-tightening part that connects and tightens both ends of a series of the hold plates and the hold plate connecting part.

A fuel cell according to the embodiment is described below with reference to the drawings.

First Embodiment

Figure 1:
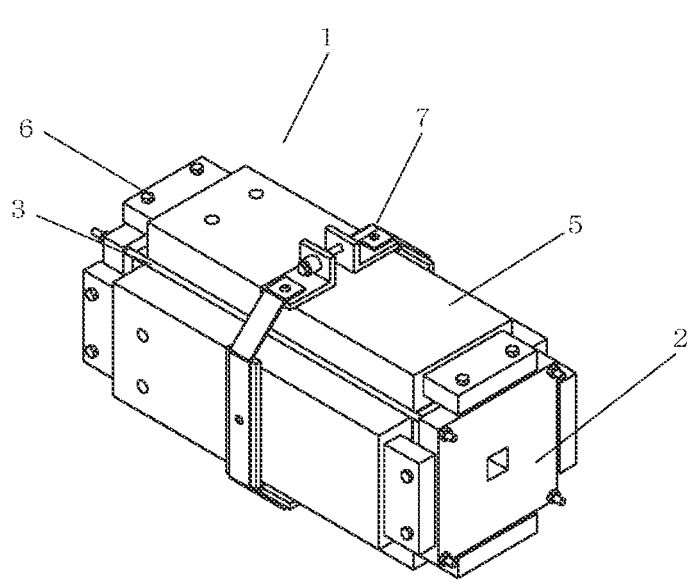
FIG. 1 is a perspective view of a first embodiment.
Figure 2A:
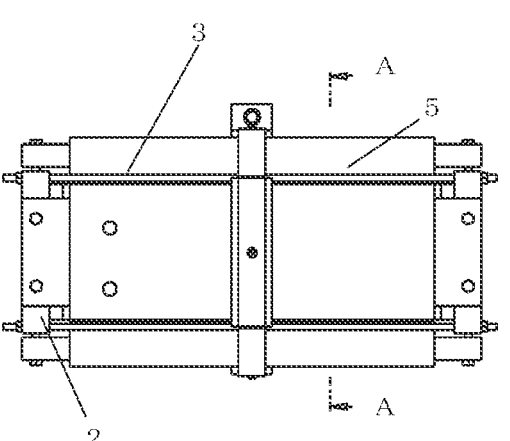
FIG. 2A is a side view of the first embodiment.
Figure 2B:
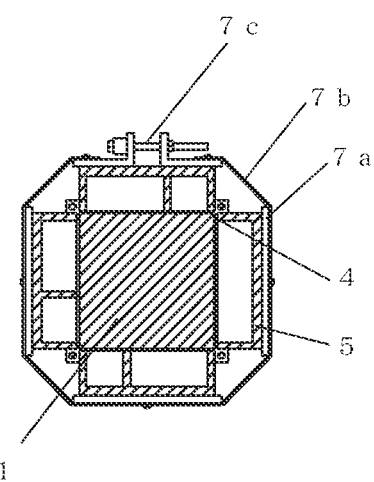
FIG. 2B is an A-A sectional view of the first embodiment.
Figure 3:
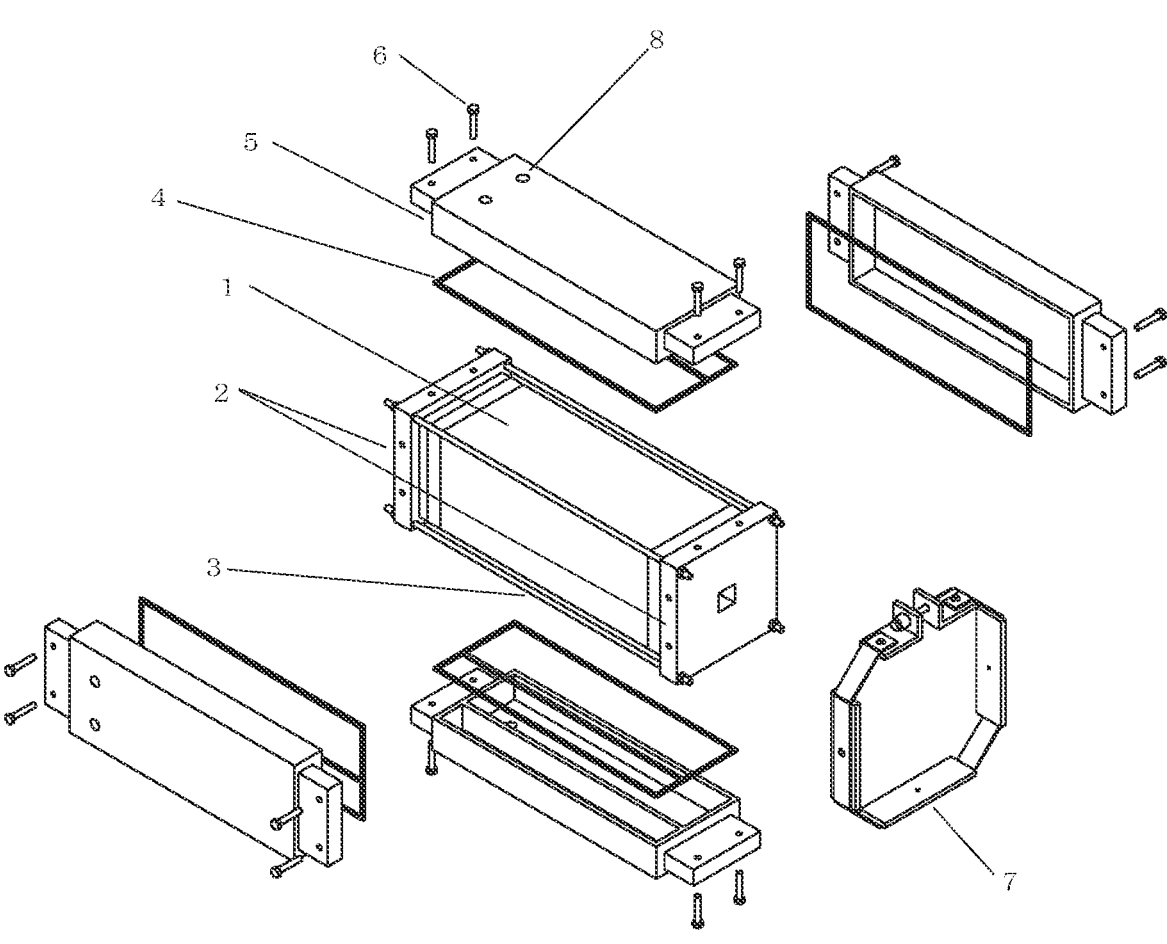
FIG. 3 is an exploded perspective view of the first embodiment.
Figure 13:
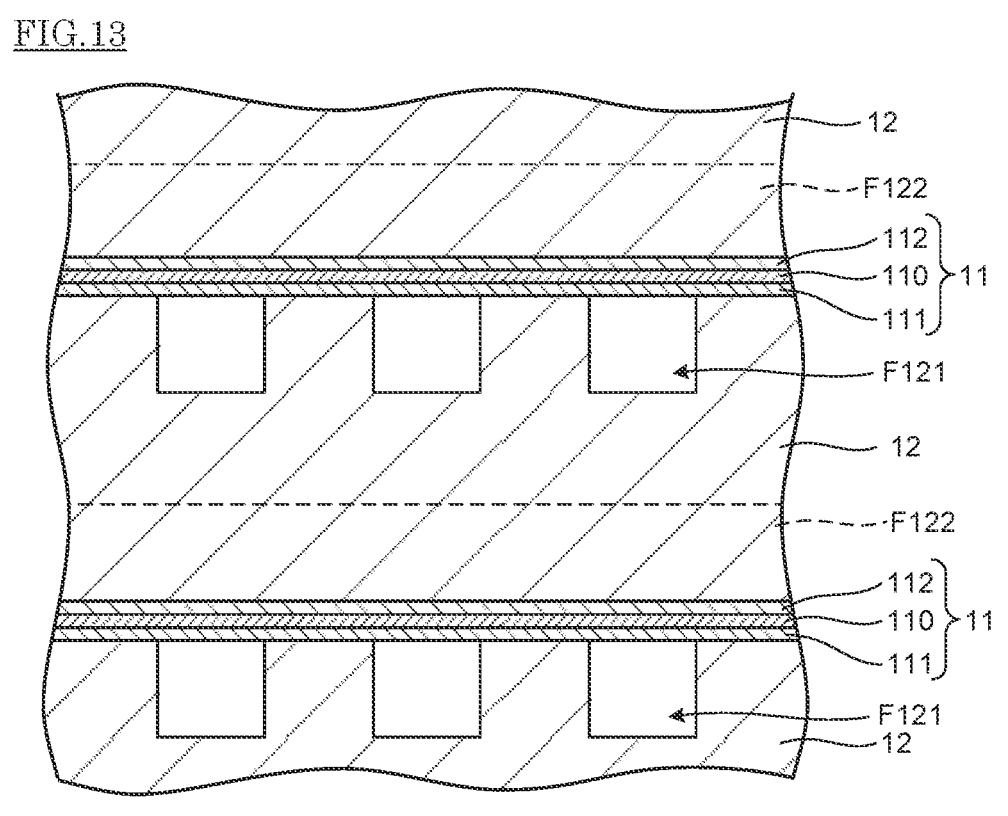

FIG. 1 is a perspective view illustrating a constitution of a fuel cell according to a first embodiment, FIG. 2A is a side view, FIG. 2B is an A-A sectional view of FIG. 2A, and FIG. 3 is an exploded perspective view. As illustrated in these figures, a fuel cell stack 1 is fixed in a stacked state by tightening a pair of end plates 2 with a plurality of tie rods 3. FIG. 13 is a partial sectional view of the fuel cell stack 1. As illustrated in FIG. 13, the fuel cell stack 1 is constituted by stacking a plurality of unit cells 11 each formed by an anode electrode 111 and a cathode electrode 112 arranged on each side of an electrolyte 110 and a separator 12 arranged in contact with each of the anode electrode 111 and the cathode electrode 112 and having a fuel gas flow path F121 and an oxidant gas flow path F122. The fuel gas flow path F121 and the oxidant gas flow path F122 are, for example, orthogonal to each other in an extending direction. They are formed such that the fuel gas flow path F121 extends in a direction orthogonal to a paper sheet in FIG. 13, and the oxidant gas flow path F122 extends in a direction along the paper sheet in FIG. 13.

A resin gas manifold 5 is attached to each side surface of the fuel cell stack 1 and end plate 2 with a sealing member 4 therebetween. The gas manifold 5 is fixed to the end plate 2 and the fuel cell stack 1 by screwing gas manifold fixing bolts 6 through holes at both ends of the gas manifold 5 into screw holes in the end plate 2. The gas manifolds 5 are used to supply fuel and oxidant to each of the fuel gas flow paths and oxidant gas flow paths of the fuel cell stack 1.

Figure 4:
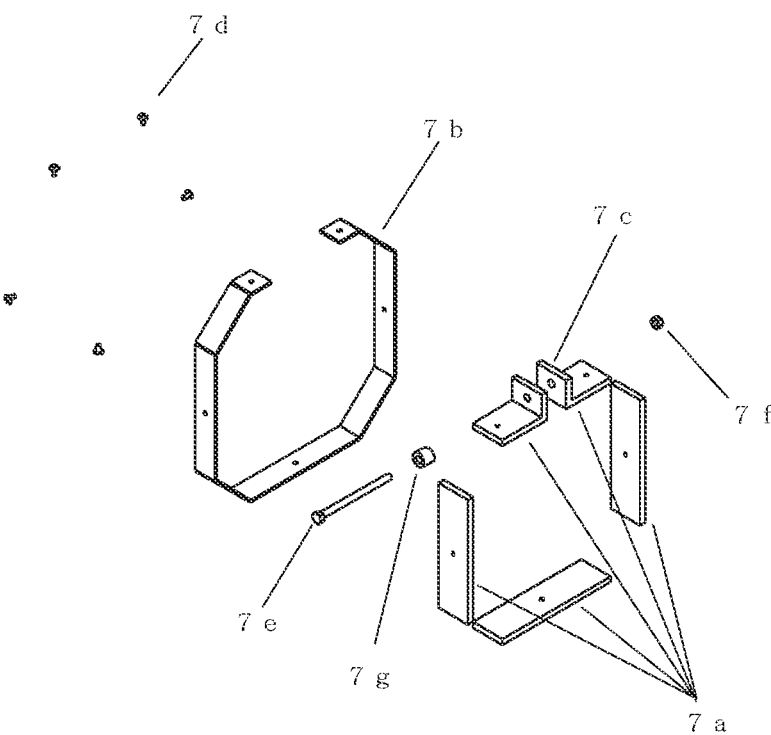
FIG. 4 is an enlarged exploded perspective view of a substantial part of the first embodiment.

A gas manifold fixing band 7 is installed near a center of each gas manifold 5 to wrap around the outside of each of the gas manifolds 5 on four sides. As illustrated in FIG. 4, the gas manifold fixing band 7 includes hold plates 7a, a hold plate connecting part 7b, and a band-tightening part 7c.

The hold plate 7a is a plate-shaped component made of steel material and has mechanical strength (rigidity) to the extent that it does not greatly deform even when tightened with the gas manifold fixing band 7. A contact surface of the hold plate 7a with the gas manifold 5 is processed to be smooth, resulting in low frictional resistance between the hold plate 7a and the gas manifold 5. The hold plate 7a is made of a thicker, more rigid member than the hold plate connecting part 7b.

The hold plate connecting part 7b is a thin plate-shaped component made of pre-bent steel material, installed in contact with the hold plate 7a, and installed in a state that presses the hold plate 7a toward the gas manifold 5 when the gas manifold fixing band 7 is tightened. The hold plate connecting part 7b has rigidity to the extent that it deforms when tightened with the band-tightening part 7c, and is made of a thinner, less rigid member than the hold plate 7a. FIG. 4 illustrates fixing screws 7d of the hold plates and connecting part to fix the hold plates 7a and the hold plate connecting part 7b.

The band-tightening part 7c is installed on both ends of a series of hold plates 7a and the hold plate connecting part 7b. The band-tightening part 7c is made up of two components connected to both ends of the hold plate connecting part 7b and is constituted such that each hold plate 7a is pressed against the gas manifold 5 by tightening in a direction where a distance between the two components becomes closer using a bolt 7e and a nut 7f. A tightening part elastic body 7g made of an elastic body such as a disc spring, coil spring, or rubber is inserted between the bolt of the tightening part and the band-tightening part 7c.

When the gas manifold fixing band 7 is tightened, the sealing member 4 is compressed and deforms, and the gas manifold 5 moves toward the fuel cell stack 1. The hold plate 7a relatively moves against the gas manifold 5 depending on the moving amount, but the hold plate connecting part 7b has a shape that is not in contact with the gas manifold 5 even when the hold plate 7a moves. In this embodiment, the hold plate connecting part 7b has the shape that is not in contact with the gas manifold 5 even when the hold plate 7a moves by making a length of the hold plate 7a longer than a length of the contact surface with the gas manifold 5. As illustrated in FIG. 3, the gas manifold 5 is provided with pipe connecting parts 8 of the gas manifold.

Action and Effect

FIG. 2B is a sectional view illustrating a state after tightening the gas manifold fixing band 7 in the first embodiment. As illustrated in FIG. 2B, the sealing members 4 between the gas manifolds 5 and the fuel cell stack 1 are crushed thinner than a state before tightening the gas manifold fixing band 7 illustrated in FIG. 5B, and the gas manifolds 5 are also closer to the fuel cell stack 1 in the state illustrated in FIG. 2B.

Since the hold plate connecting part 7b is a thin plate-shaped member, each of the hold plates 7a maintains the state in contact with a back of the gas manifold 5 by changing a bending angle of each bent portion of the hold plate connecting part 7b at a contact position with each corner of the hold plate 7a. However, since the length of the hold plate connecting part 7b hardly changes, the hold plate 7a moves against the gas manifold 5.

Figure 5A:
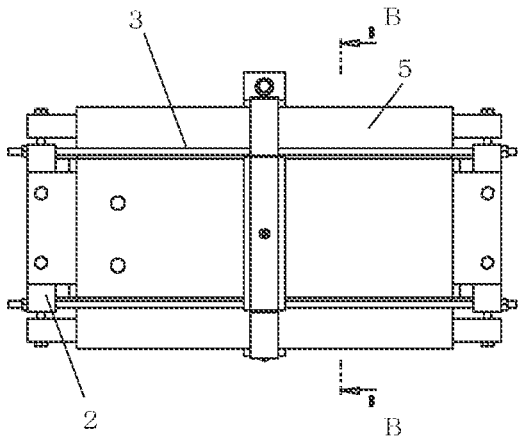
FIG. 5A is a side view illustrating a state before tightening a gas manifold fixing band of the first embodiment.
Figure 5B:
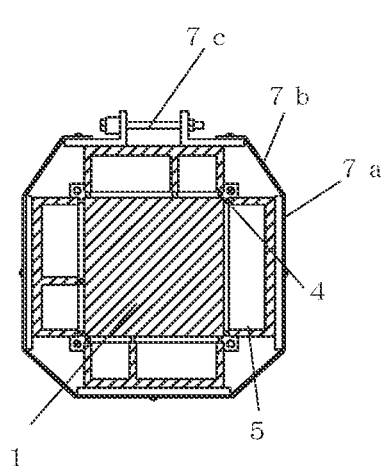
FIG. 5B is a B-B sectional view illustrating a state before tightening the gas manifold fixing band of the first embodiment.

In FIG. 2B, left and right hold plates 7a in the sectional view slide upward at the same time when the state changes from FIG. 5B to FIG. 2B. The band-tightening part 7c also slides toward the center. However, even though the hold plates 7a slide, tightening force that tightens the gas manifold fixing band 7 generates force that presses the gas manifolds 5 toward the fuel cell stack 1 through the hold plate connecting part 7b and the hold plates 7a. Furthermore, since there is little frictional resistance on the contact surface between the hold plate 7a and the gas manifold 5, the gas manifold 5 does not move horizontally against the contact surface with the sealing member 4, and a sealing surface is subjected to a uniform compressive load to ensure sealing performance.

Figure 11:
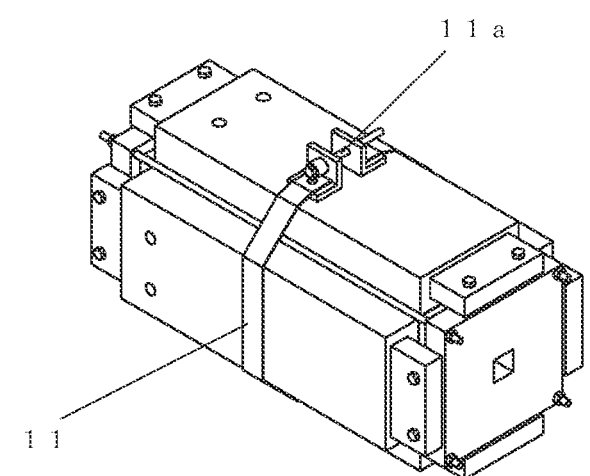
FIG. 11 is a perspective view of a fuel cell where a steel band is installed.
Figure 12A:
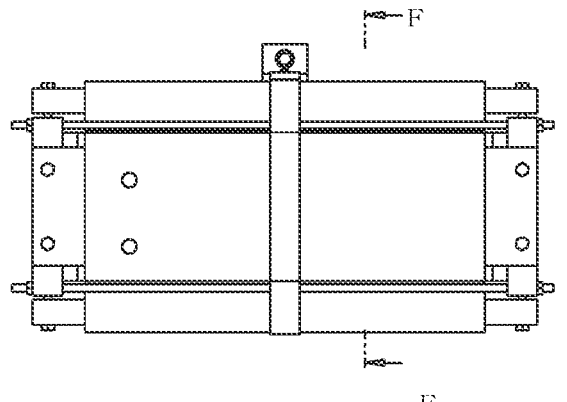
FIG. 12A is a side view of the fuel cell where the steel band is installed.
Figure 12B:
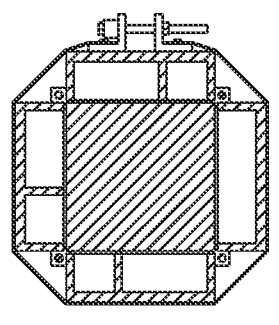
FIG. 12B is an F-F sectional view of the fuel cell where the steel band is installed.

FIG. 11, FIG. 12A, and FIG. 12B illustrate a fuel cell where a steel band 11 is installed on a conventional fuel cell, for comparison. When the steel band 11 in a thin plate is installed directly on an outer periphery of a gas manifold and tightened with a steel band-tightening part 11a, the tightening causes a sealing member to crush, the steel band 11 slides over the gas manifold, and a bent portion of the steel band that was in contact with a corner of the gas manifold also moves and is stretched, forming a new bent portion at a place that is newly in contact with the corner of the gas manifold.

However, when a thickness of the steel band 11 is not sufficiently thin, the gas manifold will be pulled by the bent portion of the steel band 11 as the steel band 11 moves and moves horizontally against a contact surface with the sealing member, or a uniform compressive load is not applied to a sealing surface. When the thickness of the steel band 11 is thin, sufficient tightening force cannot be added due to low tensile strength, or the band is used under high tensile stress, resulting in increased sleep deformation, and the tightening force tends to decrease over time.

In contrast, the first embodiment has the action and effect described above.

Second Embodiment

Figure 6:
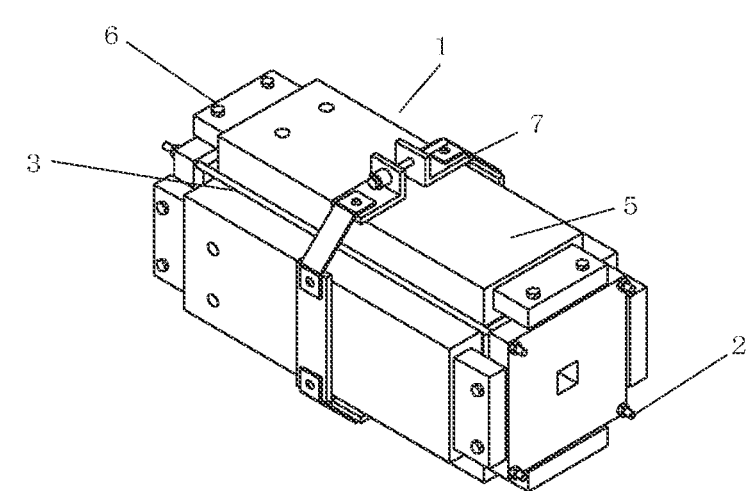
FIG. 6 is a perspective view of a second embodiment.
Figure 7A:
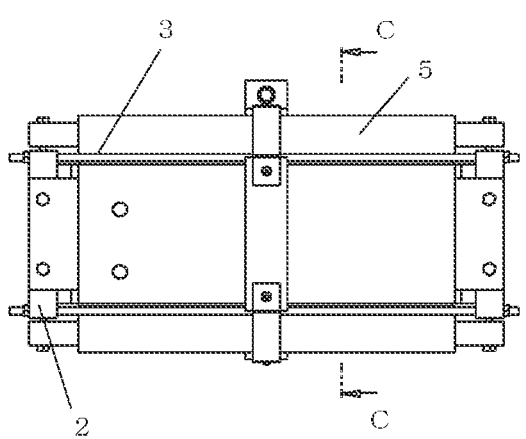
FIG. 7A is a side view of the second embodiment.
Figure 7B:
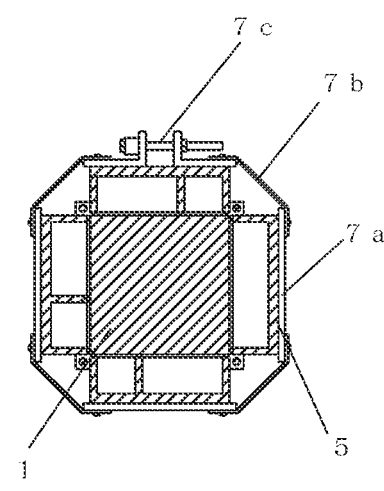
FIG. 7B is a C-C sectional view of the second embodiment.

FIG. 6, FIG. 7A, and FIG. 7B illustrate a constitution of a fuel cell according to a second embodiment. In the first embodiment described above, the hold plate connecting part 7b of the gas manifold fixing band 7 was constituted by a thin plate-shaped component made of one sheet of steel material where the whole is connected, as illustrated in an enlarged exploded perspective view of a substantial part in FIG. 4. In contrast, in the second embodiment, the hold plate connecting part 7b of the gas manifold fixing band 7 is a component, which connects two adjacent hold plates 7a, and is made of a total of four thin plate-shaped components made of steel material as illustrated in FIG. 6, FIG. 7A, and FIG. 7B. Other constitutions are the same as the first embodiment. The action and effect are also the same as the first embodiment.

Third Embodiment

Figures 8, 9A, 9B:
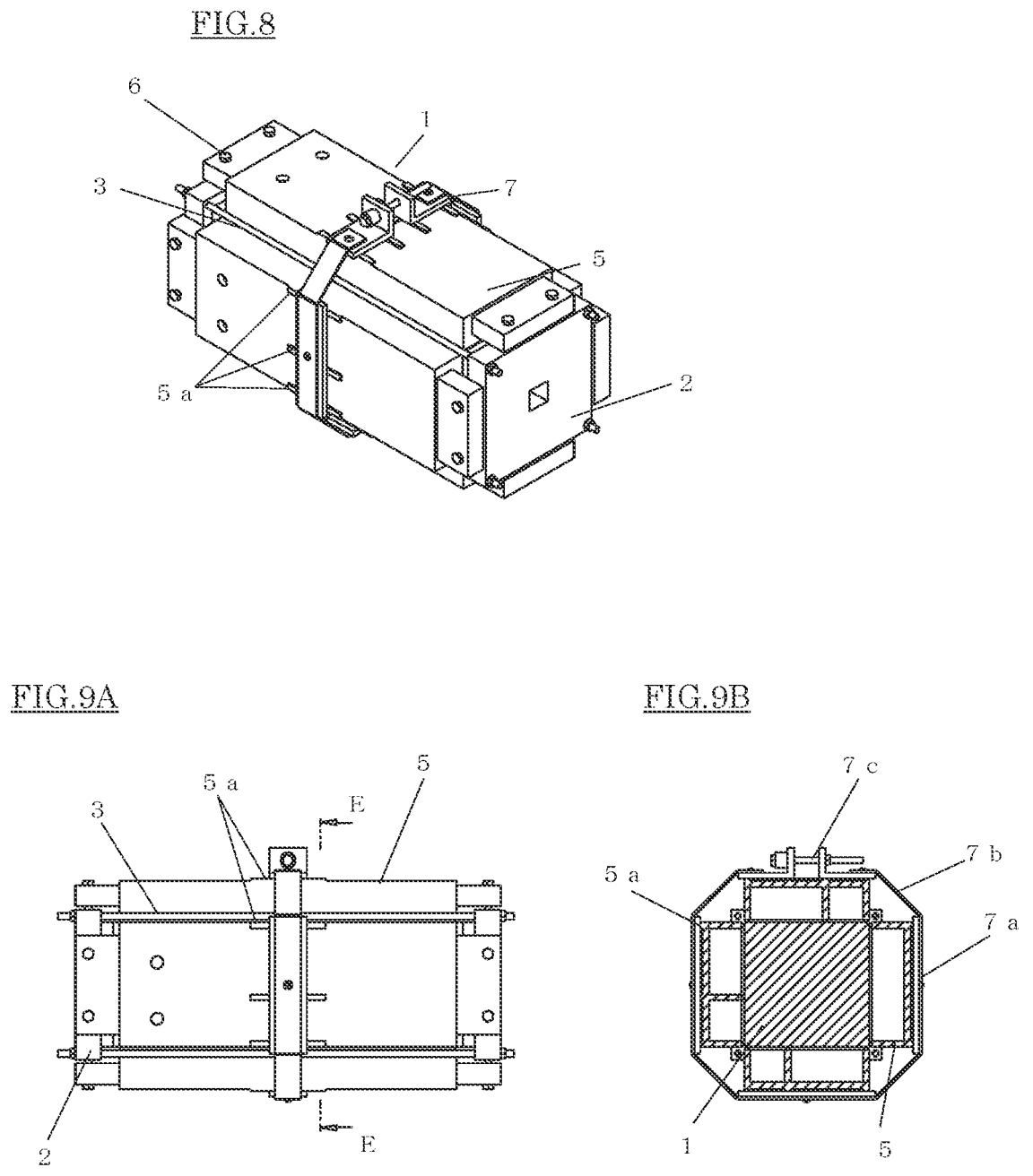

FIG. 8, FIG. 9A, and FIG. 9B illustrate a constitution of a fuel cell according to a third embodiment. As illustrated in FIG. 8, FIG. 9A, and FIG. 9B, each gas manifold 5 of the third embodiment is provided with protruding parts 5a at portions in contact with the hold plate 7a of the gas manifold fixing band 7. A plurality of protruding parts 5a are provided, and in examples illustrated in FIG. 8, FIG. 9A, and FIG. 9B, each gas manifold 5 is provided with three protruding parts 5a spaced apart. These protruding parts 5a make an area near a sealing portion (where the sealing member 4 is located illustrated in FIG. 3) protrude toward the hold plate 7a, reducing contact resistance with the hold plate 7a. Other constitutions are the same as the first embodiment.

The action and effect are also the same as the first embodiment, but since the contact resistance between the gas manifold 5 and the hold plate 7a is reduced, it is more difficult for the gas manifold 5 to move horizontally against the contact surface with the sealing member 4 or for a contact pressure on the sealing surface to become nonuniform, making it easier to ensure the sealing performance.

Fourth Embodiment

Figure 10:
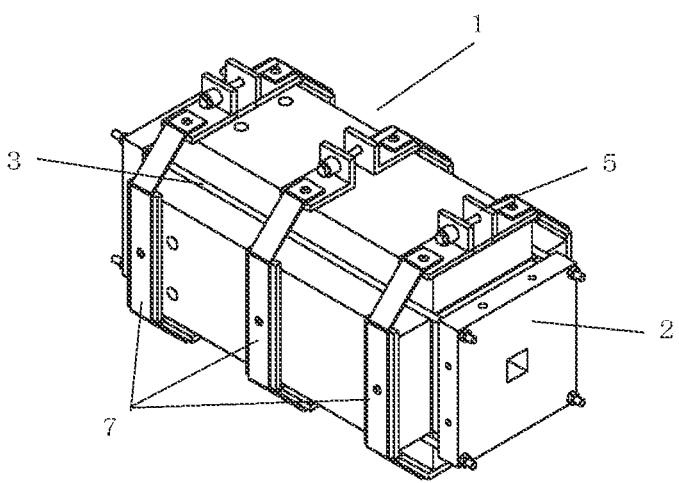
FIG. 10 is a perspective view of a fourth embodiment.

FIG. 10 illustrates a constitution of a fuel cell according to a fourth embodiment. In the first embodiment, both ends of the gas manifold 5 are fixed to the end plates 2 with the gas manifold fixing bolts 6, whereas, in the fourth embodiment, it is constituted such that both end portions of the gas manifold 5 are also fixed with the gas manifold fixing bands 7 as illustrated in FIG. 10. Therefore, a total of three gas manifold fixing bands 7 are used. Other constitutions are the same as the first embodiment. The action and effect are also the same as the first embodiment.

Other Embodiments

While certain embodiments have been described, these embodiments have been presented by way of example only, and are not intended to limit the scope of the inventions. The embodiments of the present invention may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

For example, a friction coefficient may be reduced by applying lubricant to one or both sides of the contact surface of the hold plate 7a with the gas manifold 5 or by attaching a member with low frictional resistance.

For example, the hold plate connecting part 7b does not have to be a steel material in a thin plate but may have a constitution in which each hold plate 7a can be kept in contact with the back of the gas manifold 5 by changing a relative angle between adjacent hold plates 7a, and can be a member with hook parts at both ends, which can be used to hook the hook parts onto both ends of the hold plate 7a so that a connection angle between the hold plate connecting part 7b and the hold plate 7a is variable.

Furthermore, the gas manifold fixing band 7 may be used in combination with other fixing methods and any number of locations, as long as there is one location or more.

EXPLANATION OF REFERENCE NUMERALS

1 . . . fuel cell stack, 2 . . . end plate, 3 . . . tie rod, 4 . . . sealing member, 5 . . . gas manifold, 5a . . . protruding part, 6 . . . gas manifold fixing bolt, 7 . . . gas manifold fixing band, 7a . . . hold plate, 7b . . . hold plate connecting part, 7c . . . band-tightening part, 7d . . . fixing screw of hold plate connecting part, 7e . . . connecting part bolt, 7f . . . connecting part nut, 7g . . . connecting part elastic body, 8 . . . pipe connecting part of gas manifold, 11 . . . unit cell, 12 . . . separator, 110 . . . electrolyte, 111 . . . anode electrode, 112 . . . cathode electrode, F121 . . . fuel gas flow path, F122 . . . oxidant gas flow path

What is claimed is:

1. A fuel cell including:

a fuel cell stack being constituted by stacking a plurality of unit cells formed by an anode electrode and a cathode electrode arranged on each side of an electrolyte, and a separator arranged in contact with each of the anode electrode and the cathode electrode and having a fuel gas flow path and an oxidant gas flow path;

a pair of end plates for holding the fuel cell stack by tightening from both ends;

a plurality of gas manifolds being fixed to the fuel cell stack and the end plates with sealing members therebetween to supply fuel and oxidant, respectively, to each of the fuel gas flow paths and the oxidant gas flow paths of the fuel cell stack; and a gas manifold fixing band comprising:

hold plates being each installed in contact with each of backs of the gas manifolds;

a hold plate connecting part for connecting the hold plates installed on the backs of adjacent gas manifolds with each other; and a band-tightening part for connecting and tightening both ends of a series of the hold plates and the hold plate connecting part, wherein, when the gas manifold fixing band is tightened, each of the gas manifolds does not move horizontally against the contact surface with the sealing member, and each of the hold plate moves against each of the gas
manifolds, and thereby force that presses each of the
gas manifolds toward the fuel cell stack is generated.

2. The fuel cell according to claim 1, wherein
the hold plate connecting part is formed by a thin plate-
shaped member that deforms when tightened by the
band-tightening part, and
each of the hold plates is formed by a plate-shaped
member that is thicker and more rigid than the hold
plate connecting part.

3. The fuel cell according to claim 2, wherein
each of the hold plates is longer than the back of each of
the gas manifolds with which each of the hold plates is
in contact, and the hold plate connecting part is not in
contact with each of the gas manifolds.

4. The fuel cell according to claim 1, further comprising:
a frictional resistance reducing unit provided between at
least one of the gas manifolds and at least one of the
hold plates, configured to reduce frictional resistance
between the back of at least one of the gas manifolds
and at least one of the hold plates.

5. The fuel cell according to claim 4, wherein
the frictional resistance reducing unit is protruding parts
that are provided at the back of at least one of the gas
manifolds to reduce a contact area between the back of
the at least one of the gas manifolds and at least one of
the hold plates.

\*  \*  \*  \*  \*